No. 773,453. PATENTED OCT. 25, 1904.
S. R. BAILEY.
AXLE NUT.
APPLICATION FILED JUNE 23, 1903.
NO MODEL.
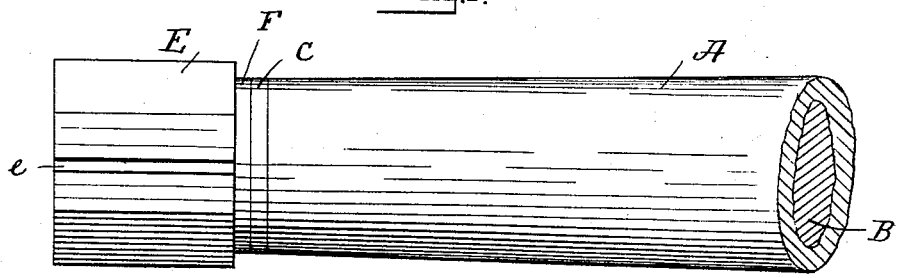
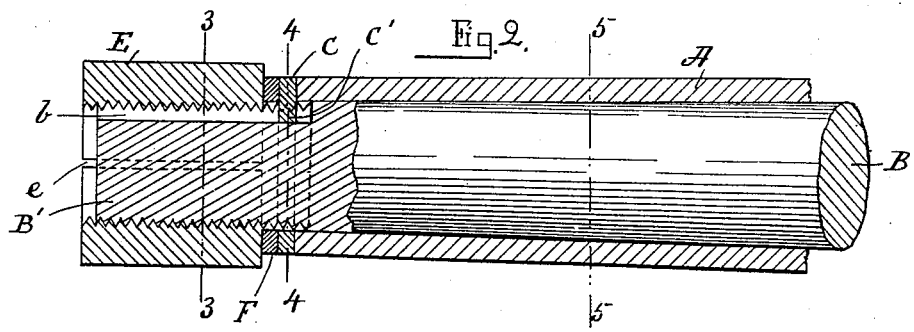
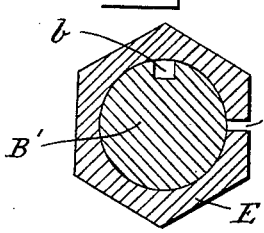 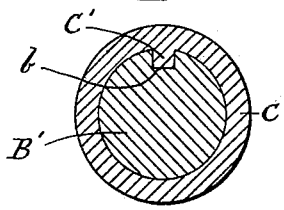 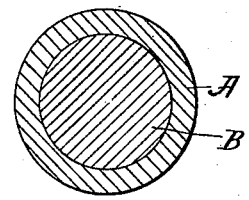
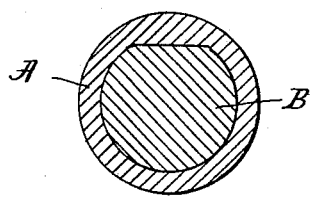
Witnesses.
Lauritz N. Möller
Anna B. Hammerich
Inventor
Samuel R. Bailey.
by Alban Andrew
his attorney.

No. 773,453.                                    Patented October 25, 1904.

UNITED STATES PATENT OFFICE.

SAMUEL R. BAILEY, OF AMESBURY, MASSACHUSETTS.

AXLE-NUT.

SPECIFICATION forming part of Letters Patent No. 773,453, dated October 25, 1904.

Application filed June 23, 1903. Serial No. 162,706. (No model.)

*To all whom it may concern:*

Be it known that I, SAMUEL R. BAILEY, a citizen of the United States, and a resident of Amesbury, in the county of Essex and State of Massachusetts, have invented certain new and useful Improvements in Axle-Nuts, of which the following is a specification.

This invention relates to improvements in adjustable axle-nuts especially designed for carriage-axles for the purpose of setting up from time to time and adjusting the position of the axle-nut relative to the end of the axle-box and holding said nut securely in its adjusted position upon the axle without the employment of check-nuts, as will hereinafter be more fully shown and described, reference being had to the accompanying drawings, wherein—

Figure 1 is a side elevation of the invention. Fig. 2 is a central longitudinal section of Fig. 1. Fig. 3 is a cross-section on the line 3 3 shown in Fig. 2. Fig. 4 is a cross-section on the line 4 4 shown in Fig. 2. Fig. 5 is a cross-section on the line 5 5 shown in Fig. 2; and Fig. 6 is a cross-section similar to that represented in Fig. 4, showing a modified form of the non-rotating washer interposed between axle-box and the adjustable slitted nut.

Similar letters refer to similar parts wherever they occur on the different parts of the drawings.

A represents the axle-box, and B represents the axle journaled therein, as usual. The outer end of the axle B terminates as an externally-screw-threaded portion B', preferably provided with a longitudinal groove *b*, as shown in Figs. 2, 3, and 4.

Adjacent to the outer end of the axle-box A is located upon the screw-threaded portion of the axle a non-rotating washer C, preferably provided with an interior projection C', fitting the axle-groove *b*, by which arrangement said washer is held interlocked with the axle, while at the same time it may be longitudinally adjusted thereon in setting up the axle-nut, as may be needed from time to time to compensate for wear of the axle-box and axle or other parts comprising the device.

I wish to state that in this my invention it is essential that the said washer C should be held from rotation on the axle, so as to prevent the axle-nut from working loose during the rotation of the carriage-wheel and axle-box secured to it; but it is not essential that said non-rotating washer should be made with a tooth or projection C', guided in a corresponding longitudinal recess in the outer end of the axle, as, if so desired, the axle end may be made with a flattened surface adapted to interlock with what is usually termed a D-washer, as shown in Fig. 6, or the said washer may be otherwise held from rotation on the axle and capable of longitudinal adjustment thereon. The washer C is preferably made of any suitable metal, but may be made of fiber or other suitable material without departing from the essence of my invention.

Upon the screw-threaded end of the axle is arranged an adjustable expansive and internally-screw-threaded nut E, provided with a longitudinal slit *e*, extending the whole length of said nut, as shown in Figs. 1, 2, and 3. In practice I make the internal screw-thread in the said slitted nut slightly smaller in diameter than the external screw-thread on the axle end, so as to cause the expansive slitted nut to be frictionally held in position relative to the axle when screwed thereon and adjusted, as may be desired.

In practice I prefer to interpose between the non-rotating washer C and inner end of the nut E a washer or elastic cushion F, which may be made of leather, rubber, or other suitable elastic or yielding material, or, if so desired, it may be made in the form of a coiled or elastic spring, as may be most practical and desirable. Said elastic washer serves to take up the end thrust of the wheel and axle-box relative to the axle-nut, so as to prevent rattling caused by the wear of the adjacent parts or otherwise. If so desired, I may interpose a similar elastic washer between the end of the axle-box and the non-rotating washer C; but this is not essential and is well known in axle-box devices.

The external portion of the slitted nut E may be polygonal, cylindrical, or otherwise, as may be desired.

Having thus fully described the nature, construction, and operation of my invention, I wish to secure by Letters Patent and claim—

In an adjusting axle-nut device, the combination with an axle-box and an axle having a screw-threaded end, of an expansible nut slitted longitudinally from end to end at one point of its length with the ends formed by said slit disconnected, said nut of a length approximately equal to that of the screw-threaded end of the axle and adjustable on and frictionally engaging the screw-threads of said axle end, and a non-slitted longitudinally-adjustable washer mounted on said screw-threaded end of the axle, said washer provided with means to prevent the rotation thereof, said means engaging in the said screw-threaded end of the axle, substantially as herein shown and described.

In testimony whereof I have affixed my signature in presence of two witnesses.

SAMUEL R. BAILEY.

Witnesses:
ALBAN ANDRÉN,
MARY MCCLOSKEY.